(12) United States Patent
Knebel et al.

(10) Patent No.: US 8,749,405 B2
(45) Date of Patent: Jun. 10, 2014

(54) NAVIGATION SYSTEM AND RADIO RECEIVING SYSTEM

(75) Inventors: Karsten Knebel, Munich (DE); Liza Hassel, Munich (DE); Frank Wolf, Bühl (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 139 days.

(21) Appl. No.: 13/416,883

(22) Filed: Mar. 9, 2012

(65) Prior Publication Data

US 2012/0166204 A1    Jun. 28, 2012

Related U.S. Application Data

(63) Continuation of application No. PCT/EP2010/004637, filed on Jul. 29, 2010.

(30) Foreign Application Priority Data

Sep. 10, 2009  (DE) .......................... 10 2009 041 007

(51) Int. Cl.
*G08G 1/123* (2006.01)

(52) U.S. Cl.
USPC .............. 340/995.14; 704/275; 704/E21.001; 345/619

(58) Field of Classification Search
CPC ............. G01C 21/3635; G01C 21/367; G09B 29/106; G10L 15/265; G10L 15/22; G08G 1/0969
USPC .............. 340/995.14, 995.1; 345/619; 701/1, 701/201, 211; 704/275, E21.001
See application file for complete search history.

(56) References Cited

U.S. PATENT DOCUMENTS

| | | | | |
|---|---|---|---|---|
| 5,020,107 A | * | 5/1991 | Rohani et al. | 704/275 |
| 6,314,365 B1 | * | 11/2001 | Smith | 340/995.1 |
| 6,839,670 B1 | * | 1/2005 | Stammler et al. | 704/251 |
| 7,031,834 B2 | * | 4/2006 | Ito et al. | 340/995.14 |
| 2001/0040505 A1 | * | 11/2001 | Ishida et al. | 340/435 |
| 2002/0087589 A1 | | 7/2002 | Wallman | |
| 2003/0065427 A1 | * | 4/2003 | Funk et al. | 701/1 |

FOREIGN PATENT DOCUMENTS

| | | |
|---|---|---|
| DE | 100 03 617 A1 | 8/2001 |
| EP | 0 852 051 B1 | 7/1998 |
| EP | 1 341 363 A1 | 9/2003 |
| EP | 1 555 608 A1 | 7/2005 |
| JP | 7 296 021 A | 11/1995 |
| WO | WO 04/002125 A1 | 12/2003 |

OTHER PUBLICATIONS

German Search Report dated Dec. 13, 2012 with one page of degree of relevance (five (5) pages).
German Search Report dated Nov. 4, 2010 including partial English-language translation (Ten (10) pages).
International Search Report dated Nov. 4, 2010 (Four (4) pages).

* cited by examiner

*Primary Examiner* — Eric M Blount
(74) *Attorney, Agent, or Firm* — Crowell & Moring LLP

(57) ABSTRACT

An object of the invention is also a navigation system having an input device for the input of an input scale value, having a display device for displaying road map information according to a selected display scale value and having a processor device, wherein the number of enterable input scale values is larger than the number of the selectable display scale values.

4 Claims, 1 Drawing Sheet

NAVIGATION SYSTEM AND RADIO RECEIVING SYSTEM

CROSS-REFERENCE TO RELATED APPLICATIONS

This application is a continuation of PCT International Application No. PCT/EP2010/004637, filed Jul. 29, 2010, which claims priority under 35 U.S.C. §119 from German Patent Application No. DE 10 2009 041 007.4, filed Sep. 10, 2009, the entire disclosures of which are herein expressly incorporated by reference.

BACKGROUND AND SUMMARY OF THE INVENTION

The invention relates to a navigation system and a radio receiving system, particularly a motor vehicle navigation system and a motor vehicle radio receiving system.

Motor vehicle navigation systems and motor vehicle radio receiving systems have been known for a long time. In this case, newer systems are to be operated by means of voice input. For this purpose, for example, an input scale value and/or an input frequency value can be entered per voice.

However, the number of values for the input scale and/or the input frequency that can be entered per voice is larger than the number of given values for the display scale and/or the receiving frequency that can be selected. As a rule, a user is, however, not familiar with the selectable values, so that values are frequently put in that cannot be selected.

For example, in the case of a navigation system, the following display scale values (also called scaling factor) can be selected: 100 m, 200 m, 500 m, 1 km, 2 km, 5 km, 10 km, 20 km, 50 km, 100 km, 200 km.

However, for example, any scale value, particularly linked with the meter unit or kilometer unit, can be entered per voice or can be detected by the voice recognition system. As an alternative, it may be provided that per voice, for example, any scale value, particularly linked with the meter or kilometer unit, can be entered or can be detected by the voice recognition system, which value is between an upper and a lower limit value, which here is, for example between 100 m and 200 km.

Analogous situations occur, for example, in the case of radio receiving systems, particularly broadcast receiving systems, for example, when scaling the medium-wave reception frequency band in Europe. In this case, for example, the following frequency values between 531 kHz and 1611 kHz can be selected:

$$531\ kHz + (9\ kHz * n) \rightarrow 9\ khz\ rasters.$$

However, for example, all frequency values between 531 and 1611 can be entered per voice or can be detected by the voice recognition system. As an alternative, it may be provided that, per voice, for example, any frequency value between 500 and 1,650 can be entered or can be detected by the voice recognition system.

There are therefore situations in which a value is entered by the user, the user expects a corresponding reaction of the navigation system or radio receiving system but no selectable value can be assigned by the navigation system to the entered value.

An approach to a solution consists of rounding off the entered non-selectable value to a selectable value. However, this does not achieve the objective in all situations. If it is assumed, for example, that currently a scale, particularly a scale value of 10 km, is set in the navigation system and the user—in order to set a larger scale—enters, for example, 12 km, for example, by voice, a scale of 10 km will be set again as a result of the rounding-off. This does not correspond to the user's primary intention of enlarging the scale.

It is now an object of the invention to indicate a technical teaching by which a value is automatically selected that corresponds to the user's intention and, in particular is motor-vehicle-related, when the entered, particularly motor-vehicle-related value is not equal to a selectable, particularly motor-vehicle-related value.

This object is achieved by the characteristics of the independent claims. Further developments of the invention are contained in the dependent claims.

A navigation system according to the invention, particularly of a motor vehicle, a mobile telephone, a laptop or another portable device, comprises an input device for the input of an input scale value, a display device for displaying road map information according to a selected display scale and a processor device which is set up and coupled with the input device and the display device such that the number of enterable input scale values is larger than the number of selectable display scale values, the selectable display scale values, in particular, forming a subset of the enterable input scale values.

The display scale value can now be determined according to the following steps:

setting of a new input scale value as a new display scale value when the new input scale value is equal to a selectable display scale value, determining a display scale value nearest the input scale value when the new input scale value is not equal to a selectable display scale value, setting the determined (nearest) display scale value as the new display scale value when the determined display scale value is not equal to the last (currently) selected display scale value, setting the next-larger display scale value from the determined (nearest) display scale value as the new display scale value when the determined display scale value is equal to the last selected display scale value and the input scale value is larger than the last-selected display scale value, setting the next-smaller selectable display scale value from the determined (nearest) display scale value as the new display scale value when the determined display scale value is equal to the last selected display scale value and the input scale value is smaller than the currently selected display scale value.

The road map information (road map cutout, road map display) will then preferably be displayed by means of the display device according to the new display scale value.

By means of the invention, it is achieved that a display scale value corresponding to the user's intention is automatically selected particularly also when the input scale value expressing the user's intention is not equal to a selectable display scale value.

In the case of a preferred navigation system, the input device comprises a microphone and a voice recognition unit which are set up for detecting a spoken input scale value.

Also within the scope of the invention is a radio receiving system, particularly a broadcast receiving system, for example, of a motor vehicle, a mobile telephone, a laptop or of another portable device, having an input device for the input of an input frequency value, having a receiving device for receiving signals based on a selected receiving frequency value and having a processor device which is set up and coupled with the input device and the display device such that the number of enterable input frequency values is larger than the number of selectable receiving frequency values, and that the receiving frequency value can be determined according to the following steps:

setting the input scale value as a new receiving frequency value when the input frequency value is equal to a selectable receiving frequency value, determining a receiving frequency value nearest the input frequency value when the new input scale value is not equal to a selectable receiving frequency value, setting the determined receiving frequency value as the new receiving frequency value when the determined receiving frequency value is not equal to the last (currently) selected receiving frequency value, setting the next-larger receiving frequency value from the determined receiving frequency value as the new receiving frequency value when the determined receiving frequency value is equal to the last selected receiving frequency value and the input frequency value is larger than the last-selected receiving frequency value, setting the next-smaller selectable receiving frequency value from the determined receiving frequency value, as the new receiving frequency value when the determined receiving frequency value is equal to the last selected receiving frequency value and the input frequency value is smaller than the currently selected receiving frequency value.

Also within the scope of the invention is a method of adjusting a display scale value of a navigation system, particularly of a motor vehicle, a mobile telephone, a laptop or of another portable device, wherein an input scale value is entered, wherein road map information according to a selected display scale value is displayed, wherein the number of enterable input scale values is larger than the number of selectable display scale values, and wherein the (new) display scale value to be adjusted can be determined or is determined according to the following steps:

setting a new input scale value as a new display scale value when the new input scale value is equal to a selectable display scale value, determining a display scale value nearest to the input scale value when the new input scale value is not equal to a selectable display scale value, setting the determined (nearest) display scale value as a new display scale value when the determined display scale value is not equal to the last (currently) selected display scale value, setting the next-larger display scale value from the determined (nearest) display scale value as the new display scale value when the determined display scale value is equal to the last selected display scale value and the input scale value is larger than the last selected display scale value, setting the next-smaller selectable display scale value from the determined (nearest) display scale value as a new display scale value when the determined display scale value is equal to the last selected display scale value and the input scale value is smaller than the currently selected display scale value.

Also within the scope of the intention is a method of adjusting a receiving frequency value of a radio receiving system, particularly of a motor vehicle, a mobile telephone, a laptop or of another portable device, wherein an input frequency value is entered, wherein signals based on a selected receiving frequency value are received, wherein the number of enterable input frequency values is larger than the number of the selectable receiving frequency values, and wherein the (new) receiving frequency value to be adjusted can be determined or is determined according to the following steps:

setting the new input scale value as a new receiving frequency value when the input frequency value is equal to a selectable receiving frequency value, determining a receiving frequency value nearest the input frequency value when the input scale value is not equal to a selectable receiving frequency value, setting the determined receiving frequency value as the new receiving frequency value when the determined receiving frequency value is not equal to the last (currently) selected receiving frequency value, setting the next-larger receiving frequency value from the determined receiving frequency value as the new receiving frequency value when the determined receiving frequency value is equal to the last selected receiving frequency value and the input frequency value is larger than the last-selected receiving frequency value, setting the next-smaller selectable receiving frequency value from the determined receiving frequency value as the new receiving frequency value when the determined receiving frequency value is equal to the last selected receiving frequency value and the input frequency value is smaller than the currently selected receiving frequency value.

The advantages and further developments of a radio receiving system according to the invention and of the indicated processes correspond to the advantages and further developments of the navigation system according to the invention.

In the following, the invention will be explained in detail by means of embodiments with reference to the following figures:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
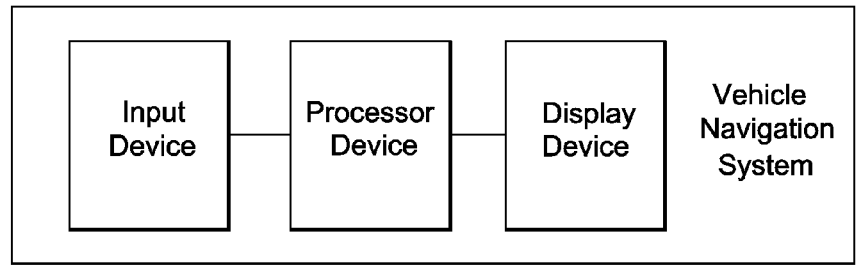
FIG. 1 is a simplified basic circuit diagram of a motor vehicle navigation system.

FIG. 1 illustrates a motor vehicle navigation system KNS having an input device EE for the input of an input scale value EM; EMN (see FIG. 2). The input device EE comprises a microphone and a voice recognition unit which is known per se and is set up to detect a spoken input scale value. The voice recognition unit may also be a component of the processor device PE.

The display device AE, for example, a graphic display, is constructed for representing road map information according to a selected display scale value GAM; GAMN (see FIG. 2).

The input device EE, a processor device PE, which may also comprise a data memory, and the display device AE are constructed with respect to the hardware and software such that the number of the input scale values EM enterable by means of the input device EE is larger than the number of selectable display scale values WAM according to which the representation of the road map information takes place by the display device AE.

Figure 2:
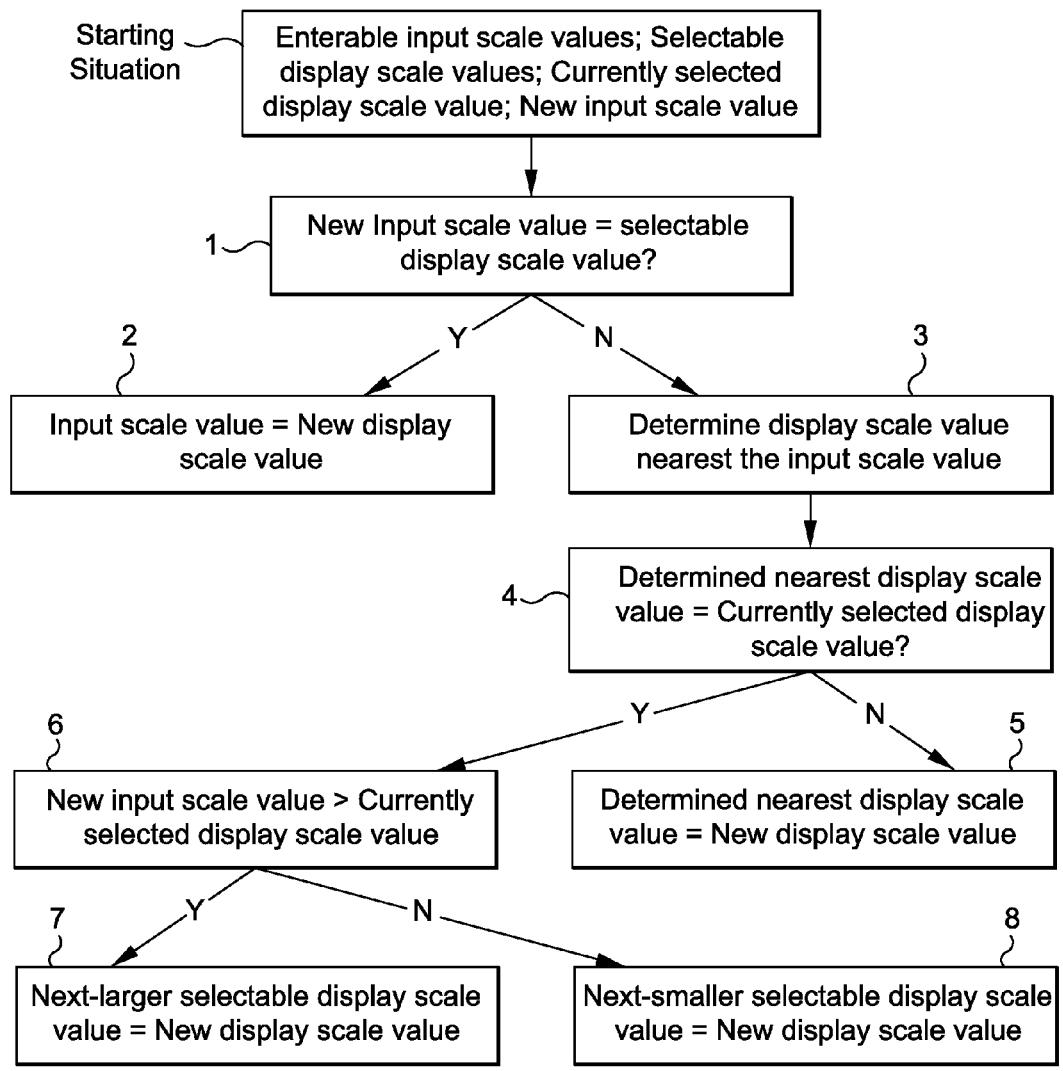
FIG. 2 is a simplified flow chart of a process that can be implemented by a motor vehicle navigation system.

The input device EE, the processor device PE and the display device AE are constructed with respect to the hardware and software such that a new display scale value GAMN (see FIG. 2) based on a new entered input scale value EMN (see FIG. 2) is determined according to the following steps illustrated by means of FIG. 2.

Starting Situation AL:

The starting point is a plurality of enterable input scale values EM and a plurality of selectable display scale values WAM, in which case the number of enterable input scale values EM is larger than the number of selectable display scale values WAM. In addition, it is assumed that a display scale value GAM is currently set or selected, and that a new input scale value EMS is entered in order to select a new display scale value GAMN. It can also be provided that the number of values of the enterable input scale values EM is limited, for example, by an upper and a lower limit value.

Step 1:

Checking whether the new, entered or detected input scale value EMN is equal to a selectable display scale value WAM.

Step 2:

Setting the input scale value EMN as the new display scale value GAMN when the input scale value EMN is equal to a selectable display scale value WAM.

Step 3:

Determining a display scale value NAM nearest the input scale value EMN when the input scale value EMN is not equal to a selectable display scale value WAM.

A display scale value NAM nearest the input scale value EMN is, for example, the display scale value WAM that has the shortest distance from the input scale value EMN, which distance can, for example, be determined as the amount of the difference between the new input scale value EMN and the corresponding display scale value WAM. The invention also comprises the use of different distance functions.

Step 4:

Checking whether the determined nearest display scale value NAM is equal to the currently selected display scale value GAM.

Step 5:

Setting the determined nearest display scale value NAM as the new display scale value GAMN when the determined display scale value NAM is not equal to the last selected display scale value GAM.

Step 6:

Checking whether the new input scale value EMN is larger than the last selected display scale value GAM.

Step 7:

Setting the next-larger selectable display scale value NAM+ from the determined nearest display scale value NAM as the new display scale value GAMN when the determined display scale value NAM is equal to the last-selected display scale value and the new input scale value EMN is larger than the last selected display scale value GAM. The next-larger selectable display scale value NAM+ from the determined nearest display scale value NAM is, for example, the selectable display scale value WAM, which is adjacent to the determined display scale value NAM, and which is larger than the determined display scale value NAM.

Step 8:

Setting the next-smaller selectable display scale value NAM− from the determined nearest display scale value as the new display scale value GAMN when the determined display scale value NAM is equal to the last selected display sale value GAM and the new input scale value EMN is smaller than the currently selected display scale value GAM. The next-smaller selectable display scale value NAM− from the determined nearest display scale value NAM is, for example, the selectable display scale value WAM, which is adjacent to the determined display scale value NAM, and which is larger than the determined display scale value NAM.

It may be provided that the Steps 1 to 8 are carried out only if the new input scale value EMN is within two given limit values. Otherwise, an fault message may be emitted, particularly may be indicated.

Finally, the map display takes place on the display device of the navigation system according to the new display scale value GAMN. The new display scale value GAMN thereby becomes the selected display scale value GAM.

The technical teaching explained above as an example by means of a motor vehicle navigation system can analogously be applied to other navigation systems and to radio receiving systems.

The following concrete example has the purpose of further explaining the invention and its advantages still with respect to a repeated reference to FIG. 2.

The basis is a navigation system which can be operated according to the following display scale values WAM: 100 m, 200 m, 500 m, 1 km, 2 km, 5 km, 10 km, 20 km, 50 km, 100 km, 200 km.

It is assumed that currently 10 km are set as the display scale value GAM.

The new input scale value EMN (12 km) is now entered by a user per voice input.

In Step 1, it is determined that the new input scale value EMN (12 km) is not equal to a selectable display scale value WAM.

In Step 3, the nearest display scale value NAM (10 km) is determined.

In Step 4, it is determined that the nearest display scale value NAM (10) is equal to the currently selected display scale value GAM (10 km).

In Step 6, it is determined that the new input scale value EMN (12 km) is larger than the currently selected display scale value GAM (10 km).

In Step 7, the next-larger display scale value NAM+ (20 km) from the determined nearest display scale value NAM (10 km) is selected as a new display scale value GAMN.

Upon the input of 12 km as the new input scale value EMN, a new display scale value GMN 20 km is thereby selected by the system. Although this new display scale value GAMN does not precisely correspond to the user's intention, but it is highly probable that it corresponds more to the user's intention than any other selectable display scale value WAM because the user probably intended to have an enlargement of the scale or the scaling factor that is as small as possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A navigation system comprising:
an input device configured to input an input scale value;
a display device configured to display road map information according to a selected display scale value; and
a processor device which is set and coupled with the input device and the display device such that a number of enterable input scale values is larger than a number of the selectable display scale values, and wherein the display scale value is determined by:
setting the input scale value as a display scale value when the input scale value is equal to a selectable display scale value, determining a display scale value nearest to the input scale value when the input scale value is not equal to a selectable display scale value, setting the determined display scale value as a display scale value when the determined display scale value is not equal to the last selected display scale value, setting the next-larger display scale value from the determined display scale value as the display scale value when the determined display scale value is equal to the last selected display scale value and the input scale value is larger than the last selected display scale value, and setting the next-smaller selectable display scale value from the determined display scale value as a display scale value when the determined display scale value is equal to the last selected display scale value and the input scale value is smaller than the currently selected display scale value.

2. The navigation system according to claim 1, wherein the input device comprises a microphone and a voice recognition unit which are configured to detect a spoken input scale value.

3. A radio receiving system comprising:

an input device configured to input an input frequency value;

a receiving device configured to receive signals based on a selected receiving frequency value; and a processor device which is set up and coupled with the input device and the display device such that the number of enterable input frequency values is larger than the number of selectable receiving frequency values, and wherein the receiving frequency value is determined by:

setting an input scale value as the receiving frequency value when the input frequency value is equal to a selectable receiving frequency value, determining a receiving frequency value nearest the input frequency value when the input scale value is not equal to a selectable receiving frequency value, setting the determined receiving frequency value as the receiving frequency value when the determined receiving frequency value is not equal to the last selected receiving frequency value, setting the next-larger receiving frequency value from the determined receiving frequency value as the receiving frequency value when the determined receiving frequency value is equal to the last selected receiving frequency value and the input frequency value is larger than the last-selected receiving frequency value, and setting the next-smaller selectable receiving frequency value from the determined receiving frequency value as the receiving frequency value when the determined receiving frequency value is equal to the last selected receiving frequency value and the input frequency value is smaller than the currently selected receiving frequency value.

4. The radio receiving system according to claim 3, wherein the input device comprises a microphone and a voice recognition unit which are configured to detect a spoken input scale value.

* * * * *